106-97
7/20/82

AU 113 EX
XR 4,340,396

United States Patent [19]
Robinson-Todd

[11] 4,340,396
[45] Jul. 20, 1982

[54] PROCESS FOR DISPOSAL OF AMMONIUM JAROSITE

[75] Inventor: David W. Robinson-Todd, Billericay, England

[73] Assignee: Stablex A.G., Zug, Switzerland

[21] Appl. No.: 217,207

[22] Filed: Dec. 16, 1980

[30] Foreign Application Priority Data

Dec. 21, 1979 [GB] United Kingdom ............... 7944286

[51] Int. Cl.$^3$ ............................ C04B 7/02; C04B 7/24
[52] U.S. Cl. ...................................... 23/293 R; 106/97; 106/DIG. 1; 405/128
[58] Field of Search ......... 23/293 R; 106/97, DIG. 1; 264/4, DIG. 49; 405/128, 129

[56] References Cited

U.S. PATENT DOCUMENTS

| | | | |
|---|---|---|---|
| 3,984,312 | 10/1976 | Duwn et al. | 106/DIG. 1 |
| 4,028,130 | 6/1977 | Webster et al. | 106/DIG. 1 |
| 4,113,504 | 9/1978 | Chen et al. | 106/97 |
| 4,116,705 | 9/1978 | Chappell | 106/97 |
| 4,149,968 | 4/1979 | Kupiec et al. | 405/128 |
| 4,226,631 | 10/1980 | Kubota | 106/97 |
| 4,274,880 | 6/1981 | Chappell | 106/97 |

*Primary Examiner*—Bradley Garris
*Attorney, Agent, or Firm*—Stevens, Davis, Miller & Mosher

[57] ABSTRACT

A hazardous ammonium jarosite based sludge is solidified by the addition of cement and fly ash under mildly basic conditions, pH 10±1.5. The ammonia does not have to be driven off prior to solidification.

3 Claims, No Drawings

PROCESS FOR DISPOSAL OF AMMONIUM JAROSITE

DESCRIPTION

This invention is concerned with the conversion of a hazardous waste comprising significant amounts of ammonium jarosite to a detoxified rock-like mass. When the waste stream from an electrolytic zinc smelting plant is filtered, the residual filter cake comprises a significant amount, typically 80%, of ammonium jarosite having the formula:

$$(NH_4)_2[Fe_6(SO_4)_4(OH_{12})]$$

lead sulphate, calcium sulphate, silica, zinc ferrite and other contaminants in smaller quantities.

As a preliminary to a controlled solidification process a small amount of water is added to the filter cake to produce a mobile sludge. This sludge may be regarded as a "liquid" hazardous waste as, though thick, it is pumpable and capable of accepting more solids.

The present invention proposes solidifying this sludge using the technique set out in Patent Specification No. 1,485,625, i.e. by admixture with a calcium-containing cement and a substance, such as fly ash, based on aluminum and silica. Experience to date has taught us that it is undesirable to solidify a waste with a soluble hazardous fraction. We have found that in a synthetic rock thus formed the hazardous fraction is not held effectively against leaching by ground water.

Accordingly in order to solidify the jarosite-based sludge effectively into a detoxified rock attempts were made to remove the very soluble ammonia by addition of a basic material until the system became so alkaline that ammonia was expelled. The addition of lime alone would not suffice and caustic soda had to be added. Ultimately it was possible effectively to dispose of the ammonia but a solidification process based on the addition of caustic soda is not economically feasible.

We have now surprisingly found out that a hazardous ammonium jarosite based sludge can be solidified into a satisfactorily detoxified synthetic rock under mildly basic conditions by the addition of fly ash and cement, without the need to remove the ammonia. By mildly basic conditions we mean conditions such that the zinc and other heavy metals are precipitated out of the acidic solution but ammonia is not released. Typically the pH of a mildly basic system in accordance with the invention will be from 8.5–11.5, 10 being a desirable value.

Usually the cement portion alone of the powder mixture is sufficient to neutralise the system to achieve this degree of basicity but lime may be added if required.

In a synthetic rock formed by a method in accordance with the invention the ammonia is effectively held in the synthetic rock against subsequent leaching.

The invention will now be described in the following Example:

The following is an analysis of a sludge derived by mixing 100 parts by weight of an ammonium jarosite filter cake with 6 parts by weight of water:

| Appearance | | Thick light brown sludge |
|---|---|---|
| pH | | 2.4 |
| Solids content-% by weight | | 55.4 |
| Specific gravity-gcm$^{-3}$ | | 1.736 |
| Ammoniacal nitrogen (N) | | 9200 |
| Permanganate value on leachate (O) | | 14 |
| Chemical Oxygen Demand on leachate (O) | | 86 |
| m-Acidity-% by weight as H$_2$SO$_4$ | | 0.3 |
| p-Acidity-% by weight as H$_2$SO$_4$ | | 1.2 |
| Arsenic | As | 3000 |
| Cadmium | Cd | 230 |
| Chromium | Cr | 6 |
| Copper | Cu | 220 |
| Iron | Fe | 48,000 |
| Lead | Pb | 4,600 |
| Manganese | Mn | 680 |
| Nickel | Ni | 10 |
| Zinc | Zn | 10,000 |

All results expressed as parts per million except for pH and where otherwise stated. It will be noted that the sludge is quite strongly acidic. The leachate is prepared by mixing 10 gm of the sludge with 100 gm of distilled water and then filtering off.

9 parts by weight of the sludge are solidified into an inert rock-like substance by the addition of 2 parts by weight of fly ash powder and 1 part by weight of Portland Cement powder. The sludge after addition of the cement and fly ash, but prior to setting, is mildly basic and has a pH of the order of 10. A leachate is then prepared by grinding 10 gm of the rock to a powder and mixing the powder thus obtained with 100 gm of distilled water. The leachate is filtered off. The leachate analysis of the synthetic rock in parts per million is as follows:

| Ammonia | (NH$_3$) | 4.8 |
|---|---|---|
| Arsenic | (As) | <0.10 |
| Cadmium | (Cd) | <0.05 |
| Copper | (Cu) | <0.10 |
| Iron | (Fe) | <0.10 |
| Manganese | (Mn) | <0.05 |
| Zinc | (Zn) | <0.02 |

As it will be seen the only detectable leachate from the synthetic rock is ammonia and at a figure of 4.8 ppm the leaching rate is environmentally acceptable. The compressive strength of the rock after 28 days was 90 p.s.i. or 0.64 MN−m$^{-2}$. This is satisfactory.

I claim:

1. A method of solidifying a hazardous sludge comprising significant amounts of ammonium jarosite by admixture with a calcium containing cement powder and a powder material based on aluminum and silica characterized in that the solidification is carried out under mildly basic conditions without the removal of ammonia.

2. A method as claimed in claim 1 wherein the hazardous sludge after addition of the powders but before solidification has a pH of 10±1.5.

3. A method as claimed in claim 1 wherein the hazardous sludge is derived from an electrolytic zinc smelting plant.

* * * * *